US006341775B1

(12) United States Patent
Matz, IV

(10) Patent No.: US 6,341,775 B1
(45) Date of Patent: Jan. 29, 2002

(54) PRINTING PRESS SIGNATURE STACKER

(76) Inventor: Henning R Matz, IV, 690 Randi La., Hoffman Est, IL (US) 60194

( * ) Notice: Subject to any disclaimer, the term of this patent is extended or adjusted under 35 U.S.C. 154(b) by 0 days.

(21) Appl. No.: 09/480,906

(22) Filed: Jan. 11, 2000

(51) Int. Cl.[7] .......................... B65H 29/00; B65H 31/08
(52) U.S. Cl. ....................... 271/186; 271/198; 271/212
(58) Field of Search ................................. 271/184, 185, 271/186, 198, 212, 216

(56) References Cited

U.S. PATENT DOCUMENTS

| 3,591,171 A | * | 7/1971 | Schmidt | 271/185 |
| 3,659,699 A | * | 5/1972 | Donahue et al. | 271/186 |
| 3,841,500 A | * | 10/1974 | Helminen | 271/186 |
| 4,204,671 A | * | 5/1980 | Pessina et al. | 271/186 |
| 4,277,060 A | * | 7/1981 | Perobelli et al. | 271/186 |

FOREIGN PATENT DOCUMENTS

| DE | 1051868 | * | 5/1959 | 271/212 |
| DE | 1232 986 | * | 12/1964 | 271/212 |

* cited by examiner

Primary Examiner—H. Grant Skaggs
(74) Attorney, Agent, or Firm—Francis C. Kowalik

(57) ABSTRACT

An improved signature stacker is disclosed which has a drive drum which operates to re-orient the signatures into a vertical stack. The drum has a curvature which is less than the maximum allowable curvature that the signatures can withstand and still recover an initial planar configuration elastically. Also disclosed is a direct drive arrangement having the drum being gear driven from a frequency controlled alternating current motor.

1 Claim, 2 Drawing Sheets

PRINTING PRESS SIGNATURE STACKER

FIELD OF THE INVENTION

The instant invention relates to stackers for printed items ("signatures") after such signatures have exited a press and/or folder.

BACKGROUND OF THE INVENTION

The flow of printed items in the modern print shop includes many items of equipment. These items serve to, automate the printing process as well as to provide uniformity to the printed items. To allow of the creation of many advertising items and the like, the modern print shop must not only print the items but also fold and stack the printed items with great uniformity and speed.

The instant invention relates to improvements in the technology of signature stackers which receive printed items from an article folder which folds printed items received from a press. These stackers, which comprise the final step in the process of assembly of many printed items have, in the past, been the cause of damage to the printed items. This damage includes crushing the printed items, folding over of the edges of such items or creasing the items. Additionally, previous stackers have required complicated direct current drive systems as well as chain and sprocket assemblies to achieve the speed control required by this particular piece of equipment. These drive assemblies have been the source of problems relating to oil sling onto the printed items from the chain as well as the additional requirement of providing a direct current supply to the drive motor.

SUMMARY OF THE INVENTION

The instant invention in the presently preferred embodiment thereof operates to receive signatures, arranged imbricate, from a press and stack same into a substantially vertical stack. This is accomplished by means of a feed belt in cooperation with the drive drum wherein the drum is of such radius as to permit the signatures to be carried about the periphery thereof without the signatures having suffered such curvature that the signatures are unable to recover their previously planar configuration; that is to say that the maximum curvature for elastic recovery of the signatures is not exceeded. Additionally, the invention comprehends a direct drive system, wherein the drum is driven and supported by shafting which is connected by gearing directly to the drive motor; thereby obviating the need for chains and the problems associated therewith as mentioned previously.

It is therefore a primary object of the invention to provide for a drive drum having a curvature less than the maximum elastic recovery curvature of a signature;

It is another object of the invention to provide for a direct drive system which precludes the possibility of oil contamination of the signatures;

It is a further object of the invention to provide for an alternating current drive motor for such direct drive system.

These and other objects of the instant invention shall become apparent from the Detailed Description of the Preferred Embodiment and Claims directed thereto.

DETAILED DESCRIPTION OF THE PREFERRED EMBODIMENT

Figure 1:
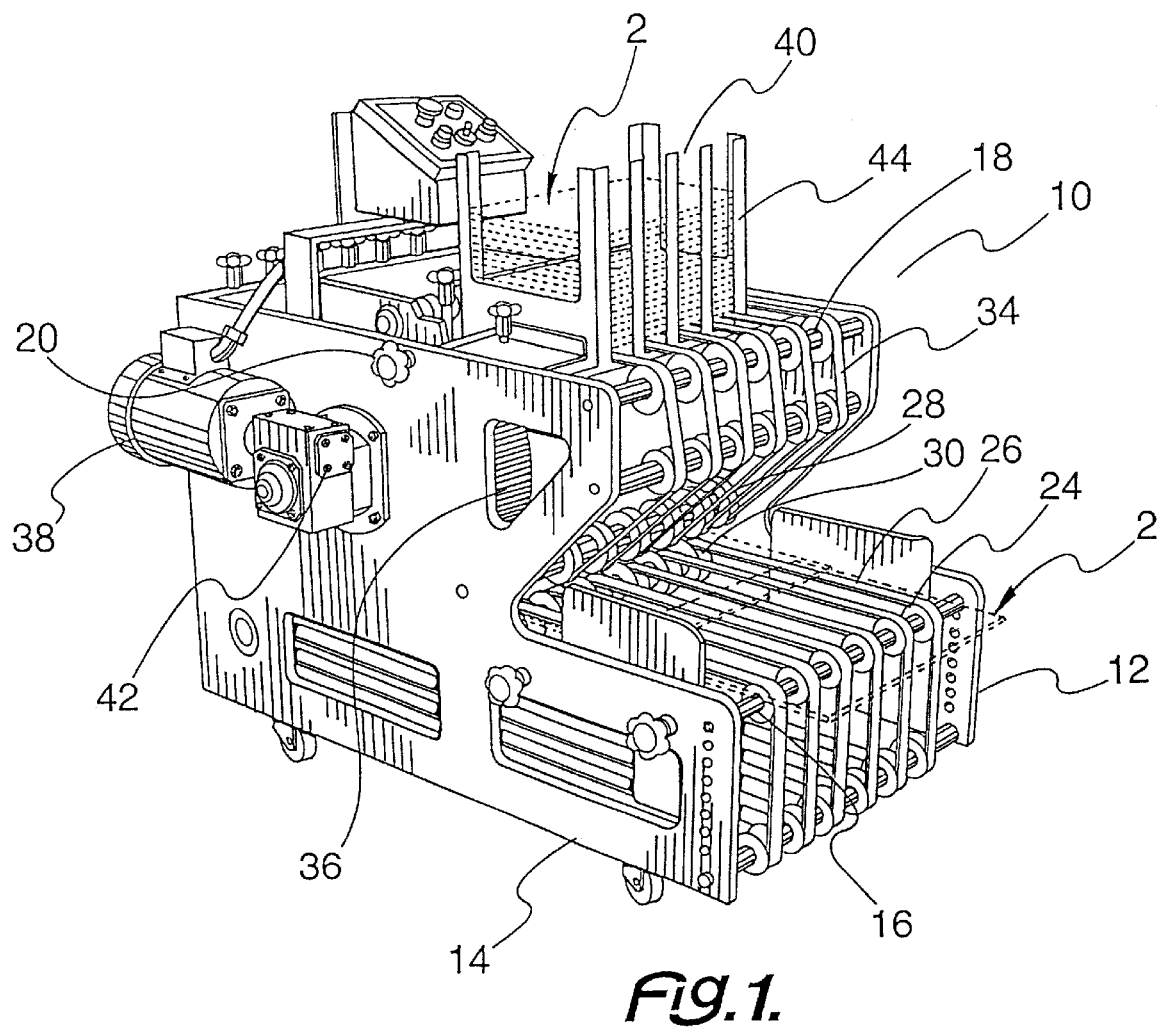
FIG. 1 is a perspective view of the novel stacker.
Figure 2:
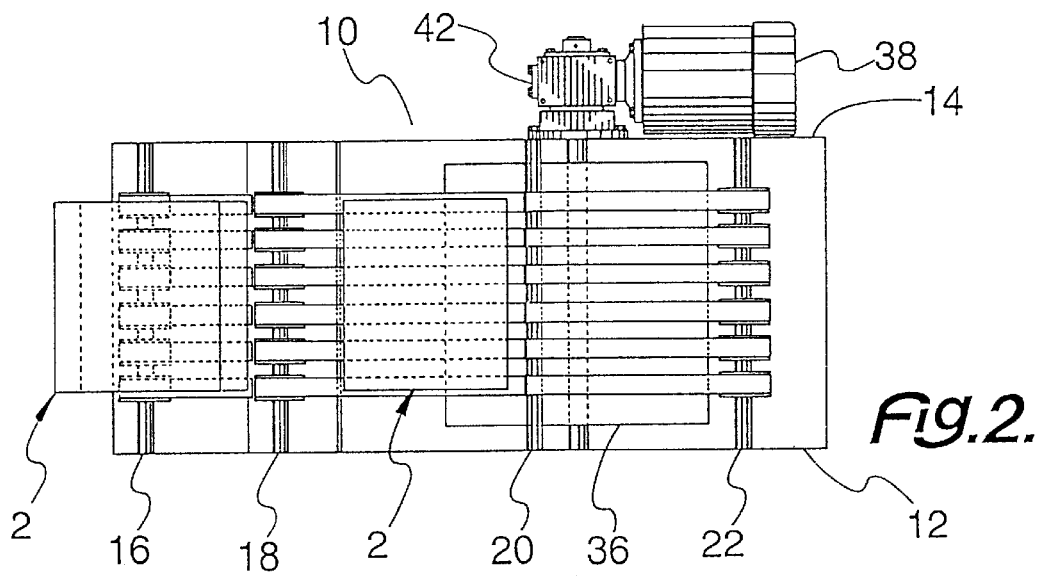
FIG. 2 is a plan view if the top of the stacker.
Figure 3:
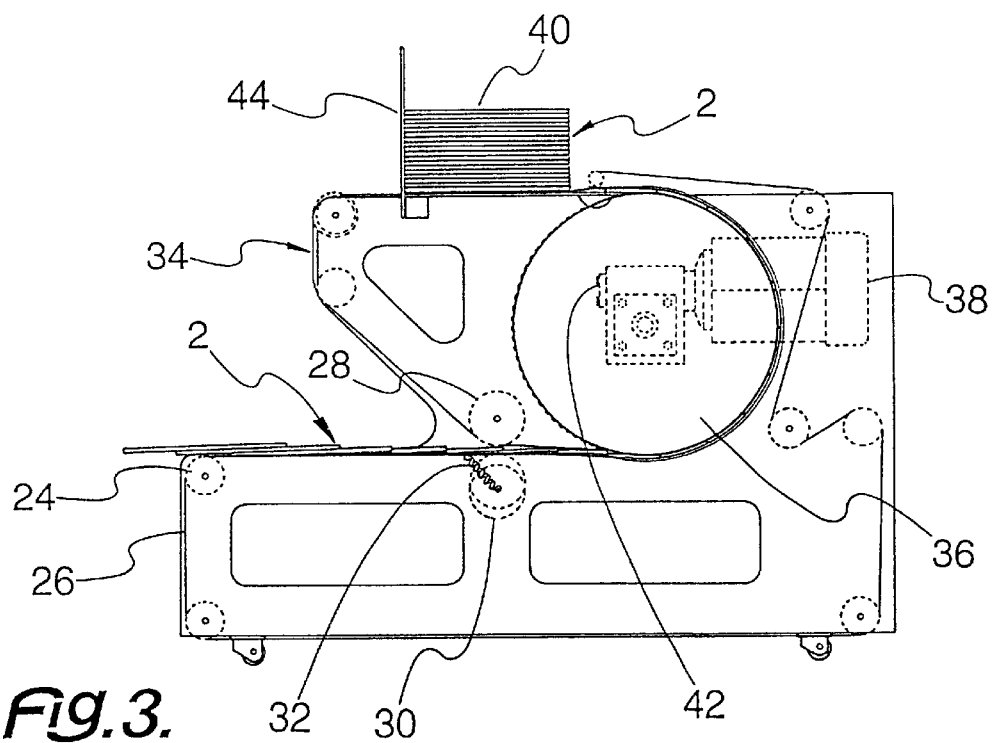
FIG. 3 is a plan view if the right side of the stacker.

The stacker 10, shown in FIG. 1, consists of a right frame 12 and a left frame 14. These frames 12,14 serve to support the additional components of the device. Frames 12,14 are preferably made of plate steel but other materials which have sufficient stiffness to maintain required tolerances of the device are substitutable. Attached to the frames 12,14 are a plurality of crossmembers 16, 18, 20, 22 which serve to fix the relative extension of the frames 12, 14 from each other, Additionally, the crossmembers 16, 18, 20, 22 support, as shafts, the various moving parts of the stacker 10. Starting from the input side of the stacker 10, input rollers 24, are supported on crossmember 16. Input rollers 24 provide the support to the input belts 26 at a position closest to the press feeding the stacker 10. The input belts 26 receive the imbricately arranged signatures 2 from the press and carry the signatures 2 into the stacker 10. Following the signatures 2, as shown in FIG. 3, the input belts 26 carry the signatures 2 to pinch rollers 28, 30. The pinch rollers 28,30 are arranged in a fixed set 28 and a floating set 30. The floating pinch rollers 30 are biased towards the fixed pinch rollers by an adjustable spring 32. The relative movement between the pinch rollers 28, 30 allows for constant force to be applied to compress the signatures 2 while allowing for the variation in thickness of the signature stream due to the imbricate nature of the arrangement of signatures 2 therein. Also by keeping a constant compressive force on the signatures 2 the chance of relative movement of the signatures in the input stream is reduced. Following the input stream, the signatures 2 are now captured between input belts 26 and table top, or outfeed belt 34. The table top belts 34 have a low coefficient of friction so as to allow the signatures 2 to remain stationary when the signatures 2 are at the end of their travel as shall be subsequently described. Continuing along the path of the signatures 2, the signatures 2 are now fixed between input belts 26 and table top belts 34. The signatures 2 are now fed onto drive drum 36. Drive drum 36 serves a plurality of purposes: first, drive drum 36 is the means of mechanical input to the device, providing motive force to both input belts 26 and table top belts 34; and secondly, drive drum 36 reverses the orientation of signatures 2 so that the imbricate input stream may assume the configuration of a vertical stack 40. The drive drum 36 receives its motive power from a variable speed AC motor 38 through a speed reduction gearbox 42. The AC motor is controlled by a variable speed drive which controls the speed of the motor by changing the frequency of the alternating current supplied to motor 38. Gearbox 42 also provides, in this preferred embodiment, a right angle change of direction in power flow so that the stacker 10 is of a compact aspect. Furthermore, gearbox 42 eliminates, when cooperative with drive drum 36, the previously employed chain drive system with all of the problems attendant therein.

Continuing along the input stream of signatures 2, the stream is brought circumferentially about drive drum 36. The radius of the drive drum 36 is larger than the minimum radius of curvature for elastic recovery of the signatures 2 to their previous planar configuration in the input stream. As noted in the Summary of the Invention, previous stackers exceeded the elastic recovery limit for the signatures 2 and required the weight of signatures in the vertical stack 40 to flatten out the signatures exiting the drive drum 36 resulting in waste of signatures 2. The instant embodiment of the drive drum 36 eliminates the "cupping" of signatures 2 by having a radius of curvature which does not exceed the elastic recovery limit for signatures 2 for which the stacker 10 is designed, thereby providing an imbricate stream of planar signatures 2 to the vertical stack 40. As noted above, the signatures are carried about the periphery of drive drum 36 and exit tangentially therefrom. The imbricately arranged signatures 2 now travel atop table top belts 34 and are intercepted by stop 44 which causes the signatures 2 to be forced under one another, due to their imbricate arrangement, and form vertical stack 40 which is subsequently removed by an operator.

The presently preferred embodiment of the instant invention described hereabove is indicative of the preferred structure thereof but is in no way meant to serve to restrict the invention more than the Claims appended hereto.

What is claimed is:

1. A stacker for receiving printed, imbricately arranged, signatures from a press folder comprising a first frame and a second frame, said first frame and said second frame being separated apart by a plurality of crossmembers wherein said crossmembers serve to support a plurality of rollers thereon; said rollers being operative to carry a plurality of belts about said rollers wherein said plurality of belts is divided into an input belt set and an outfeed belt set; said input belt set and said outfeed belt set forming a vertex therebetween wherein said vertex is formed by said input belt moving over a preloaded, moveable roller and said outfeed belt set moving over a fixed roller in near contact with said preloaded moveable roller, said vertex serving to capture said imbricately arranged signatures between said input belt set and said outfeed belt set and carry said signatures to a drive drum, said drum operative to provide motive force to said plurality of belts and to re-orient said imbricately arranged signatures; wherein said drum has a curvature defined thereon and said signatures have a maximum allowable curvature that can be applied thereto such that said signatures can recover an initial planar configuration after being subjected to such maximum curvature and said drum curvature is less than said maximum curvature; and said drum being operated by a right angle, speed reducing, gearbox, coupled to said drum and serving to support said drum from said first frame, and said gearbox is provided with motive power by a variable frequency controlled alternating current motor coupled thereto; and said drum delivering said re-oriented signatures along said outfeed belt set to a transverse stop arranged in close proximity to said outfeed belt so as to force said imbricately arranged re-oriented signatures under one another, against said stop thereby forming a vertical stack of said signatures.

\* \* \* \* \*